(12) United States Patent
Woods (10) Patent No.: US 6,656,580 B2
(45) Date of Patent: Dec. 2, 2003

(54) IMPREGNATION OF A GRAPHITE SHEET WITH A SEALANT

(75) Inventor: John G. Woods, Farmington, CT (US)

(73) Assignee: Henkel Loctite Corporation, Rocky Hill, CT (US)

( * ) Notice: Subject to any disclaimer, the term of this patent is extended or adjusted under 35 U.S.C. 154(b) by 29 days.

(21) Appl. No.: 10/111,550

(22) PCT Filed: Dec. 14, 2000

(86) PCT No.: PCT/US00/33809

§ 371 (c)(1), (2), (4) Date: Apr. 26, 2002

(87) PCT Pub. No.: WO01/43964

PCT Pub. Date: Jun. 21, 2001

(65) Prior Publication Data

US 2002/0160250 A1 Oct. 31, 2002

Related U.S. Application Data

(60) Provisional application No. 60/172,131, filed on Dec. 17, 1999.

(51) Int. Cl.[7] .............................. B32B 7/12; B29C 67/00
(52) U.S. Cl. .................... 428/304.4; 428/166; 428/188; 428/306.6; 428/317.1; 428/318.4; 264/45.1; 264/48; 156/295
(58) Field of Search ................................. 428/166, 188, 428/304.4, 306.6, 309.9, 316.6, 317.1, 317.9, 318.4, 319.9; 156/62.2, 196, 292, 295, 321; 264/5, 6, 29.1, 45.1, 46.4, 48, 241, 317

(56) References Cited

U.S. PATENT DOCUMENTS

| | | |
|---|---|---|
| 3,701,676 A | 10/1972 | Bader et al. .................. 117/49 |
| 4,567,086 A | 1/1986 | Fukuda et al. ............... 428/166 |
| 4,687,607 A | 8/1987 | Shigeta et al. ............. 264/29.5 |
| 4,729,910 A | 3/1988 | Fukuda et al. ............... 427/294 |
| 4,752,518 A | 6/1988 | Lohrke et al. ............... 428/131 |
| 5,021,284 A | 6/1991 | Miwa et al. .................. 428/166 |
| 5,149,518 A | 9/1992 | Mercuri et al. .............. 423/449 |
| 5,885,728 A | 3/1999 | Mercuri et al. ................ 429/30 |
| 5,902,762 A | 5/1999 | Mercuri et al. ................ 501/99 |

Primary Examiner—Donald J. Loney
(74) Attorney, Agent, or Firm—Steven C. Bauman (57) ABSTRACT

A method for sealing graphite plates formed from mechanically processed graphite sheets of exfoliated graphite particles is provided. The graphites sheets are infused with a sealant to fill about 90 volume percent of the pores contained in the sheet. Upon curing the sealant, a substantially gas impermeable graphite plate is provides. Such a plate is useful in fuel cell construction.

28 Claims, 5 Drawing Sheets

IMPREGNATION OF A GRAPHITE SHEET WITH A SEALANT

This application claims the benefit of No. 60/172,131, filed Dec. 17, 1999.

FIELD OF THE INVENTION

The present invention relates to a flexible graphite sheet impregnated with a sealant. More particularly, the present invention relates to the infusion of the sealant into the porosity of the graphite sheet prior to mechanical deformation of the sheet to form an article of manufacture.

BACKGROUND OF RELATED TECHNOLOGY

Natural graphites are made up of layered planes of hexagonal arrays of networks of carbon atoms and typically exist in the shape of flakes in nature. These layered planes of hexagonally arranged carbon atoms are substantially flat and are oriented so as to be substantially parallel and equidistant to one another. The substantially flat, parallel equidistant layers of carbon atoms are joined together by weak Van der Waals forces. These natural graphites are soft and brittle and are typically difficult to form into a shape due to cracking along these layered planes. Such characteristics of graphites are well known to those skilled in the art, see, e.g., U.S. Pat. No. 5,149,518.

Natural graphites, however, may be formed into flexible sheets by compressing exfoliated graphite particles. Exfoliated graphite particles are formed by expanding the natural graphite flakes. In this expansion process, natural graphite flakes are intercalated by dispersing the flakes in a solution containing an oxidizing agent, for instance, a mixture of nitric and sulfuric acid. After the flakes are intercalated excess solution is drained from the flakes and after washing with water, the intercalated graphite flakes are dried. Upon exposure to high temperature, for instance 1,090–1,370° C. (2,000–2,500° F.), the particles of intercalated graphite expand in dimension as much as 80 to 1000 or more times their original volume in an accordion-like fashion in the direction perpendicular to the layered planes of the hexagonally arranged carbon atoms of the constituent graphite particles.

The exfoliated graphite particles are then compressed or compacted together, in the absence of any binder, so as to form a flexible integrated graphite sheet of desired thickness and density. The compression or compaction is carried out by passing a thick bed of expanded particles between pressure rolls or a system of multiple pressure rolls to compress the material in several stages into sheet material of desired thickness.

The sheet material formed from the exfoliated graphite particles, unlike the original graphite flakes, can be formed and cut into various shapes. The compression operation flattens the expanded graphite particles causing them to somewhat engage and interlock. The compression reorientates many of the carbon atoms from the perpendicular, accordion-like arrangement back into layered, parallel planes. Nevertheless, some carbon atoms remain in substantially nonparallel planes. These carbon atoms in the nonparallel planes increase the porosity of the sheet as compared to natural graphite, having parallel planes of carbon atoms, provide engagement among parallel planes of carbon atoms to provide flexibility to the sheet, and allow mechanical shaping without substantial cracking. Furthermore, as the degree of compression increases, the degree of reorientation of carbon atoms from nonparallel planes into layered, parallel planes also increases, especially near the exterior surfaces of the sheet.

The density of the compressed exfoliated product is typically in the range of about 0.08 to 1.4 g/cc (5 to 90 lbs/ft$^3$) which is lower than the density of natural graphite (or fully compressed graphite) having a bulk density of about 2.2 g/cc (140 lbs/ft$^3$). As the density of a graphite product increases, the porosity of the graphite product typically decreases. Porosity, P, is defined as the fraction of the total volume of a porous substance that is occupied by the pores of the substance, as shown below in Formula I.

$$P = V_P/V_T,  \quad (I)$$

where $V_P$ is the pore volume and $V_T$ is the total volume. The pore volume, $V_P$, of a porous material is the total volume, $V_T$, less the volume of 30 the fully compressed bulk material, $V_0$, or $$V_P = V_T/V_0. \quad (II)$$

The porosity of a porous substance may also be expressed in terms of densities, as shown below in Formula III.

$$P = 1 - D_P/D_0, \quad (III)$$

where $D_P$ is the density of the porous material and $D_0$ is the density of the fully compressed material.

From Formula III, the porosity of the compressed product is about 0.96 and to about 0.36 for products having a density of about 0.08 and 1.4 g/cc, respectively. The porosity of a fully compressed material is zero because such a fully compressed material does not have pore volume. This above-calculated porosity is often referred to as true porosity because the volume of both open and sealed pore spaces are included. Apparent porosity is a measurement of just the open-pore space which is accessible to a fluid, such as nitrogen or mercury. The volume of such open pore space is then substituted for $V_P$ in Formula I.

A higher density or a lower porosity product is typically too stiff for use as flexible sheet graphite and is typically too mechanically weak to survive mechanical shaping processes. Some applications require higher impermeability or greater mechanical strength than is typical for compressed graphite sheets. For instance, anode and cathode fluid-flow plates used in a fuel cell should be substantially impermeable to gaseous reactants and products, such as hydrogen and oxygen, to avoid undesired leakage of the reactants and products. For these applications, the graphite sheet is mechanically processed into a graphite plate, and then a sealant is impregnated into the graphite plate sheet to seal the plate. Such a graphite plate without an impregnated-sealant is too mechanically weak and not sufficiently impermeable to gaseous reactants and products for use as a fuel cell plate because of its internal porosity. The impregnation of the sealant into the graphite plates for these applications, however, is often difficult to achieve because such mechanical processing alters the graphite sheets by reorienting the carbon atoms from nonparallel to layered, parallel planes thereby inhibiting sealant infusion.

These layered, parallel planes tend to block access of the internal porosity. Furthermore, as the density of the graphite sheet increases, e.g., greater than about 1.0 g/cc (62 lbs/ft$^3$), impregnation of a sealant into internal porosity becomes more difficult because the outer surface of the plate is characterized by a greater number of layered, parallel planes of carbon atoms. Impregnation of these denser sheets is often quite time consuming, thus increasing the manufacturing costs associated with such plates.

One technique for impregnating a dense graphite sheet is disclosed in U.S. Pat. No. 4,729,910. The disclosed technique is to de-aerate the sheet and to apply a sealant under multiple steps of reduced pressure and ambient pressure to facilitate the movement of the sealant into the porosity of the sheet. The technique suffers the disadvantage of requiring multiple, expensive pressure reducing steps and using a sealant dissolved in organic solvents to reduce the viscosity of the sealant to permit entry of the less viscous sealant mixture into the porosity of the sheet. The organic solvent is removed under reduced pressure conditions before the sealant is heat cured. This technique not only requires multiple pressure reducing steps to infuse the sealant, but also results in no more than about 20% by weight take-up of sealant, leaving many of the internal pores unfilled with the sealant.

U.S. Pat. Nos. 5,885,728 and 5,902,762 disclose a technique where ceramic fibers are incorporated into dense graphite sheets to facilitate subsequent sealant infusion. This technique, however, suffers from the disadvantage of introducing impurities, such as the ceramic fibers themselves, which can be harmful to certain applications, such as fuel cells where the surfaces of the graphite sheets are coated or proximal to precious metals, such as platinum. Also, only up to about 20% by weight take-up of sealant is achieved, leaving many of the internal pores unfilled with the sealant.

Despite these efforts, a need exists for sealing dense graphite sheets without introducing impurities potentially harmful to the final application and without requiring multiple, complex processing steps. Moreover, a need exists for infusing greater amounts of sealant into graphite sheets to provide a graphite plate that is substantially impermeable to light gaseous materials, for instance hydrogen gas.

SUMMARY OF THE INVENTION

The present invention relates to a method of impregnating a graphite sheet with a sealant and mechanically deforming the sealant-impregnated sheet to form a mechanically strong graphite plate. The method of the present invention is useful in filling up to about 95% by volume of the internal pores of the sheet prior to the mechanical deformation. The sealant within the pores of the mechanically deformed sheet is cured to provide a substantially gas-impermeable plate that is mechanically strong.

A low density graphite sheet having a graphite density of about 0.08 to about 0.8 g/cc is provided for sealant infusion. An anaerobic-curing or a heat-curing sealant that is capable of absorption into the internal pores of the sheet is selected. This sealant is contacted with the low density sheet to obtain a 95% by volume void fill of the internal pores. The sealant-impregnated sheet is mechanically compressed to form a graphite plate which is substantially gas impermeable after the resin is cured by a free radical mechanism.

Useful sealant include phenolic resins, vinyl resins, silicone resins, acrylic resins, epoxy resins and the like. (Meth) acrylic resins are particularly useful. Such sealants can be thermally or anaerobically cured by free radical mechanisms.

In one aspect of the present invention, a substantially gas impermeable graphite plate is provided. The graphite plate of the present invention has up to about 95% by volume of its pores filled with a curable sealant, which results in a substantially gas impermeable graphite plate. Such plate is useful as a fuel plate in a fuel cell.

DETAILED DESCRIPTION OF THE INVENTION

Flexible graphite sheets that are formed from exfoliated graphite particles have greater internal porosity or a greater amount of pores than natural graphites. Although the present invention is described as a flexible graphite sheet, other forms are suitable with the present invention. For example, exfoliated graphite particles may be suitable processed into other shapes, such as, but not limited to, a cone, a cube, a cylinder, a disk, a prism, a parallelepiped, a sphere, and the like. As the graphite sheet is formed into a denser product, the internal pores are typically inaccessible because of increased surface layers and constituent layers of carbon atoms below the surface that are substantially parallel to that surface of the sheet. These layers block the flow of a sealant into the pores of the sheet. Sealant will, however, flow readily within the sheet in directions parallel to opposed parallel planar surfaces if the sealant can first penetrate past the parallel surface atoms.

As used herein, the phrase "flexible graphite sheets" and its variants refer to an article of manufacture formed from compression of exfoliated graphite particles without a resin.

The present invention provides a method of sealing a graphite sheet by providing access for fluid communication of a sealant to these internal pores. The fluid communication permits the flow of a sealant into the porosity of the graphite sheet. Upon curing the sealant, a substantially gas impermeable graphite sheet is obtained. Such a sealed sheet is useful as an anode or cathode fuel plate in a fuel cell.

Figure 1:
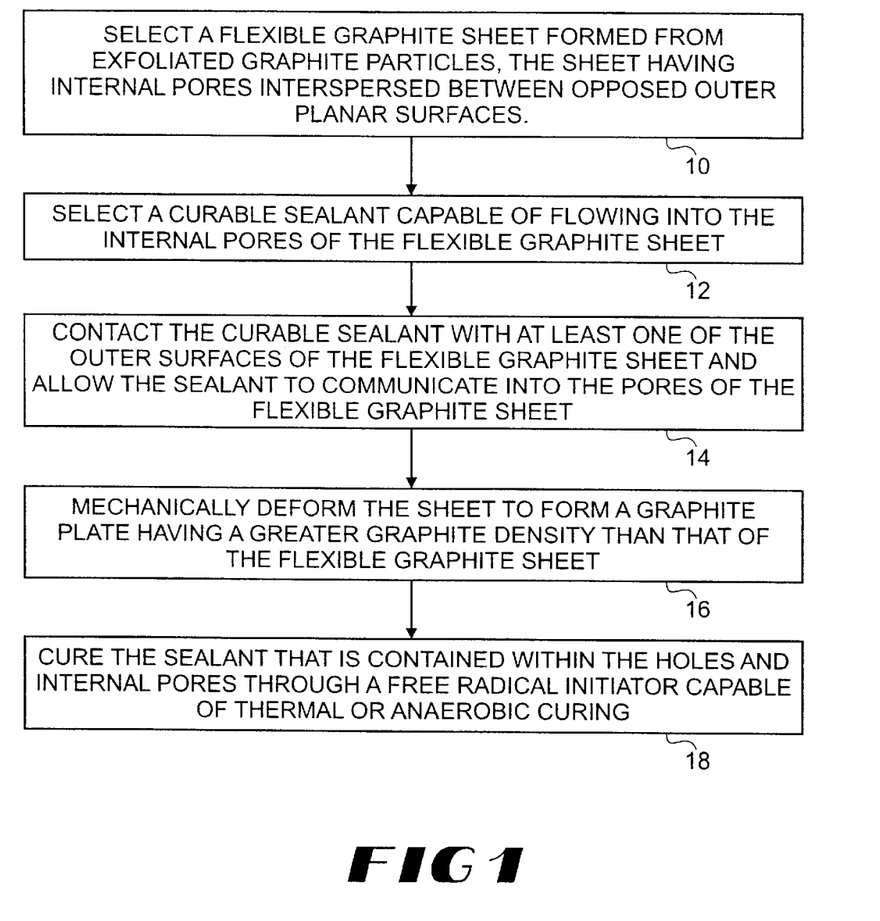
FIG. 1 is a schematic of a method of the present invention for infusing sealant into a flexible graphite sheet.

FIG. 1 is a schematic of the method of the present invention for sealing graphite plates.

At step 10, a graphite form, such as a flexible graphite sheet, is selected. The flexible graphite sheet, which has an internal porous portion between opposed exterior, outer planar surfaces, may be formed by an exfoliation process and is also commercially available from the UCAR Carbon Technology Corporation, located in Danbury, Conn., under the trade name Grafoil®. A flexible graphite sheet can be made or is available in a wide range of densities. For instance, exfoliated graphite particles can be formed into flexible graphite sheets having internal pores resulting in a graphite density of about 0.08 to 1.4 g/cc (5 to about 90 lbs/ft$^3$). Higher density materials are more difficult to impregnate with a sealant than lower density materials due to a greater alignment of the carbon atoms in the layered, parallel groups, especially at or near an outer surface of the sheet. Graphite sheets of high porosity or low density with a graphite density of about 0.08 to about 0.8 g/cc (5 to 50 lbs/ft$^3$) are useful with the present invention. Graphite sheets having a graphite density of about 0.08 to about 0.5 g/cc (5 to 31 lbs/ft$^3$) are also useful with the present invention. As used herein, the phrase "graphite density" and its variants refer to a density of a flexible graphite sheet without having any sealant infused into the internal pores of the sheet.

At step 12, a curable sealant is selected. Useful sealants include heat-curable and anaerobic-curing sealants, such as Resinol® 90C and RTC sealants, which are commercially available form the Loctite Corporation, Rocky Hill, Conn. These useful sealants are further described herein.

At step 14, the curable sealant of step 12 is contacted with at least one of the outer planar surfaces of the flexible graphite sheet of step 10. The sealant communicates from the outer surface into the internal pores of the sheet because the low density graphite sheet of step 10 has accessible porosity at its external surfaces to provide fluid communication for a sealant into its internal pores. The term "fluid communication" and its variants refer to, but are not limited to, fluid impregnation, fluid transmission, fluid flow, fluid permeation, and the like.

The sealant may be applied to the graphite sheet after the sheet is placed under a vacuum to remove air from the porosity of the sheet. The removal of the air from the pores facilitates the subsequent infusion of sealant. Such removal of air under vacuum conditions, however, is not required to practice the method of the present invention, but is desirable for increasing infusion rates or reducing time requirements for infusion. Furthermore, the sealant may be applied under ambient or positive pressure conditions. A positive pressure often helps to drive the sealant into the pores.

At step 16, the sealant-impregnated sheet of step 14 is mechanically processed to form a graphite plate. Mechanical deformation, such as compression, is a useful process for forming the plate. Furthermore, as described further herein, such mechanical deformation can also include the impressing of a pattern onto a surface of the plate.

The mechanical deformation typically results in a more denser sheet. For example, a graphite sheet with a graphite density of about 0.08 to about 0.5 g/cc may be mechanically deformed resulting in a compressed sheet or plate with a graphite density greater than 1.0 g/cc. Furthermore, portions of the mechanically deformed sheet may be more resistant to sealant infusion than other portions. These aspects are illustrated in FIGS. 2A–2D.

Figures 2A, 2B:
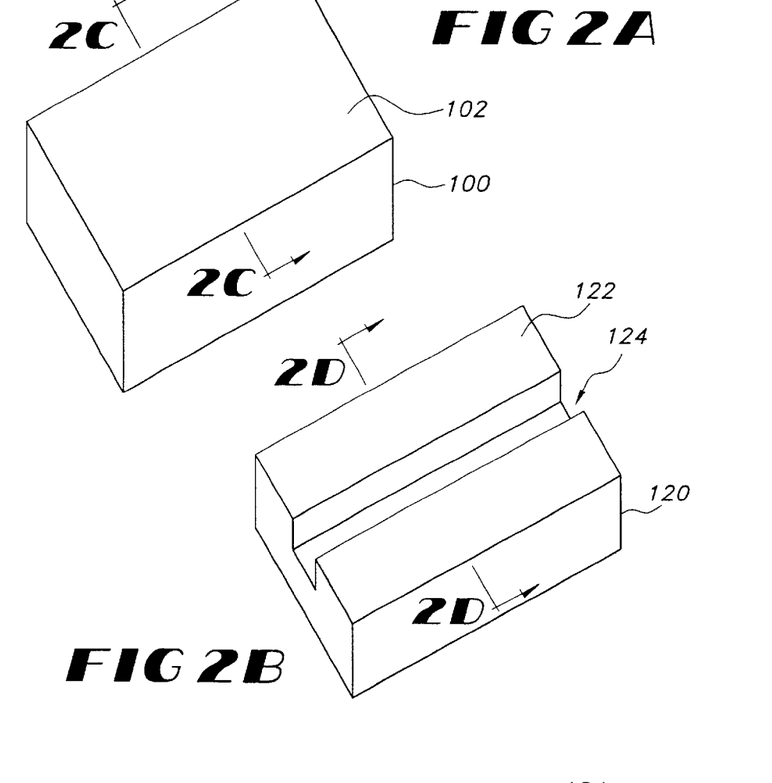
FIG. 2A is a perspective view of a low density, flexible graphite sheet.
FIG. 2B is a perspective view of the sheet of FIG. 2A that has been mechanically deformed to form a graphite plate with a pattern therein.

FIG. 2A is a schematic of a flexible graphite sheet 100. Desirably, the flexible graphite sheet 100 has a graphite density of about 0.08 to about 0.5 g/cc. Flexible graphite sheet 100 may be mechanically deformed to form graphite plate 120, which is schematically depicted in FIG. 2B. Graphite plate 120 may have a pattern, such as channel 124, within planar surface 122. Graphite plate 120, including channel 122, may be formed through use of a compression plate (not shown) bearing of relief pattern of channel 122. Such a compression plate may be compressed onto planar surface 102 of flexible graphite sheet 100.

Figure 2C:
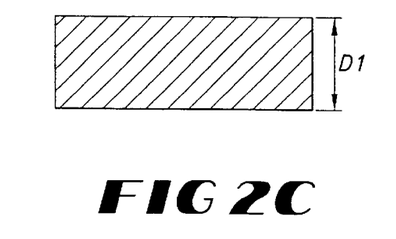
FIG. 2C is a cross-sectional view of the sheet of FIG. 2A.
Figure 2D:
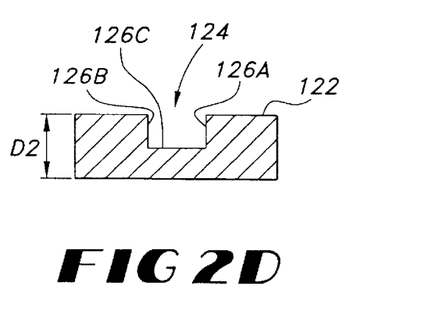
FIG. 2D is a cross-sectional view of the plate of FIG. 2B.

FIGS. 2C and 2D are cross-sectional views of flexible graphite sheet 100 and graphite plate 120, respectively, taken along respective 2C—2C and 2D—2D axes. Portions of the graphite plate 120 that form channel 122, such as channel portions 126 A, B and C, typically have a greater graphite density than that of the flexible graphite sheet 100. The higher graphite density makes sealant infusion more difficult because of, in part, a greater alignment of carbon atoms in layered groups parallel to channel portions 126A, B and C.

Furthermore, as depicted in FIGS. 2C and 2D, if the thickness of flexible graphite sheet 100, which is represented by vector D1, is reduced during mechanical compressions to yield a smaller thickness of the graphite plate 120, which is represented by vector D2, then substantial portions of planar surface 122 of graphite plate 120 may also be resistant to graphite infusion due to greater graphite densities and greater alignment of carbon atoms thereat.

Returning to FIG. 1, at step 18, the curable sealant of step 12 is desirably cured through a free radical mechanism. Thermal and anaerobic curing are useful with the present invention and are described below. Sealants may also be cured by ionic mechanisms.

Flexible graphite sheet, such as sheet 100, with a graphite density of about 0.22 g/cm$^3$ was degassed under a vacuum of about 0.13 kilopascals (1 torr). The degassed sheet was contacted with a liquid porosity sealant, such as Resinol® 90C. The sealant filled the internal pores to an extent of about 95% by volume. The 95% by volume void fill represented a weigh increase of 429% for the sealant-impregnated sheet. A denser sheet having a graphite density of about 1.14 g/cm$^3$ was impregnated under similar conditions. The weight increase was only 22%, which represents a void fill of about 48% by volume.

It was expected that the extent of resin up-take in flexible graphite sheet would vary in inverse linear relationship to the graphite density. However, this is not the case. The graphite density of the first sheet (0.22 g/cm$^3$) was 0.192 times (approximately ⅕) the graphite density of the second sheet (1.14 g/cm$^3$), yet the lower density sheet absorbed approximately 20 times the amount of sealant compared to the higher density sheet. This was 4 times greater than was expected from the density differences of the two materials.

The amount of sealant up-take can be controlled over a wide range by varying the impregnation pressure, temperature, sealant viscosity, impregnation time of density of the sheet. It is generally desirable to have a sealant up-take that fills as completely as possible the void volume of the sheet. The percent of voids filled can be estimated from the volumes and weights of the non-impregnated and the sealant-impregnated sheets, the density of the sealant (1.09 g/cm$^3$) and the density of bulk graphite (2.2 g/cm$^3$). In general, it is exceedingly difficult to fill more than about 70% by volume of the voids in compressed high-density grades of graphite sheets that are typically used for fuel cell construction. By impregnating the graphite sheet before it is compressed, almost quantitative filling of the voids has been attained. In addition, the impregnation rates are significantly enhanced by filling the voids before compressing the structure.

The impregnated low-density graphite sheet is soft and easily deformed while the sealant remains in its liquid form. On compression, excess liquid may, if necessary, be removed. The final amount of liquid sealant remaining in the sheet is determined, in part, by the load that is applied during compression and by the time period during which that load is maintained. Compression plates bearing a relief pattern of a fluid-flow channels may be used to impress the required pattern into the soft liquid-filled sheet prior to the curing of the resin.

The Resinol® 90C is a methacrylate-based thermosetting impregnation sealant that cures rapidly to give a hard impermeable matrix on heating at temperatures of 90° C. or higher. The liquid sealant in the above sheets is desirably cured by means of a hot press, which may be used to simultaneously compress, imprint and cure the sealant composition. Curing times depend on the final plate thickness and the amount of sealant up-take. Typically curing times range from a few minutes to 1 hour over a temperature range of about 90 to about 180° C. Anaerobic-curing sealants, such as Resinol® RTC from the Loctite Corporation, are also useful with the present invention. Such anaerobic sealants may be cured at ambient temperatures in the substantial absence of oxygen.

In another aspect of the present invention, a flexible graphite plate infused with a sealant for use as a fuel cell plate is provided. The present invention, however, is not limited to fuel cell plates, but can also be used in other applications where high strength graphite or highly impermeable graphite is desirable. For example, a graphite gasket for a high pressure application may require greater strength and impermeability, as achieved by sealant impregnation, than a graphite gasket for a low pressure application.

Figure 3:
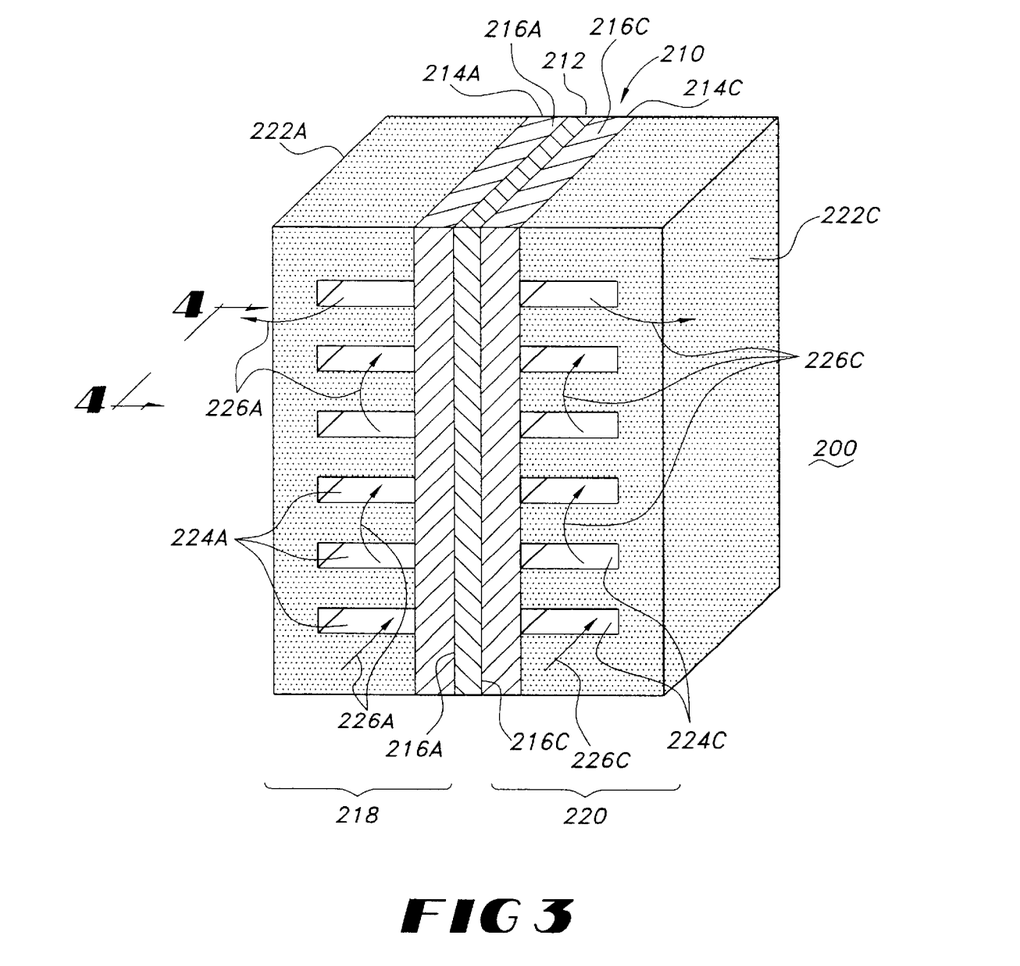
FIG. 3 is a schematic of a fuel cell containing graphite plates of the present invention.

The flexible graphite sheet 100 of the present invention is useful as a fluid-flow field plate for use in a fuel cell. FIG. 3 shows, schematically, the basic elements of an electrochemical fuel cell, such as fuel cell 200. Electrochemical fuel cells convert fuel and oxidant to electricity and reaction product. The fuel cell 200 includes a membrane electrode assembly ("MEA") 210 consisting of a solid polymer electrolyte or ion exchange membrane 212 disposed between two electrodes 214A, 214C formed of porous, electrically conductive sheet material, typically carbon fiber paper. The MEA 210 contains a layer of catalyst (not shown), typically in the form of finely comminuted platinum, at each membrane/electrode interface 216A, 216C to induce the desired electrochemical reaction. The electrodes 214A, 214C are electrically coupled to provide a path for conducting electrons between the electrodes to an external load (not shown).

At anode 218, the fuel permeates the porous electrode material of electrode 214A and reacts at the catalyst layer (not shown) at membrane/electrode interface 216A to form cations, which migrate through the ion exchange membrane 212 to cathode 220. At the cathode 220, oxygen-containing gas reacts at the catalyst layer (not shown) at membrane/electrode interface 216C to form anions. The anions formed at the cathode 220 react with the cations to form a reaction product.

In electrochemical fuel cells employing hydrogen as the fuel and oxygen-containing air (or substantially pure oxygen) as the oxidant, the catalyzed reaction at the anode 218 produces hydrogen cations (protons) from the fuel supply. The ion exchange membrane 212 facilitates the migration of hydrogen ions from the anode 218 to the cathode 220. In addition to conducting hydrogen ions, the ion exchange membrane 212 isolates the hydrogen-containing fuel stream from the oxygen-containing oxidant stream. At the cathode 220, oxygen reacts at the catalyst layer (not shown) at membrane/electrode interface 216C to form anions. The anions formed at the cathode 220 react with the hydrogen ions that have crossed the ion exchange membrane 212 to form liquid water as the reaction product. The anode and cathode reactions in hydrogen/oxygen fuel cells are shown in the following equations:

Anode reaction: $H_2 \rightarrow 2H^+ + 2e^-$  (IV)

Cathode reaction: $\tfrac{1}{2}O_2 \rightarrow 2H^+ + 2e^- \rightarrow H_2O$  (V)

The MEA 210 is disposed between two electrically conductive plates, such as fluid-flow field plates 222A, 222C, each of which has at least one flow passage 224A, 224C contained therein. These fluid-flow field plates 222A, 222C are typically formed of compressed, exfoliated graphite. The flow passages 224A, 224C direct the fuel and oxidant to the respective electrodes, namely, the anode 218 on the fuel side and the cathode 220 on the oxidant side. In a single cell arrangement, fluid-flow field plates are provided on each of the anode and cathode sides. The plates act as current collectors, provide support for the electrodes, provide access channels for the fuel and oxidant to the respective anode and cathode surfaces, and provide channels for the removal of water formed during operation of the cell.

Two or more fuel cells 200 can be connected together, generally in series but sometimes in parallel, to increase the overall power output of the assembly. In series arrangements, one side of a given plate serves as an anode plate for one cell and the other side of the plate can serve as the cathode plate for the adjacent cell. Such a series connected multiple fuel cell arrangement is referred to as a fuel cell stack (not shown), and is usually held together in its assembled state by tie rods and end plates. The stack typically includes manifolds and inlet ports for directing the fuel and the oxidant to the anode and cathode flow field channels.

Figure 4:
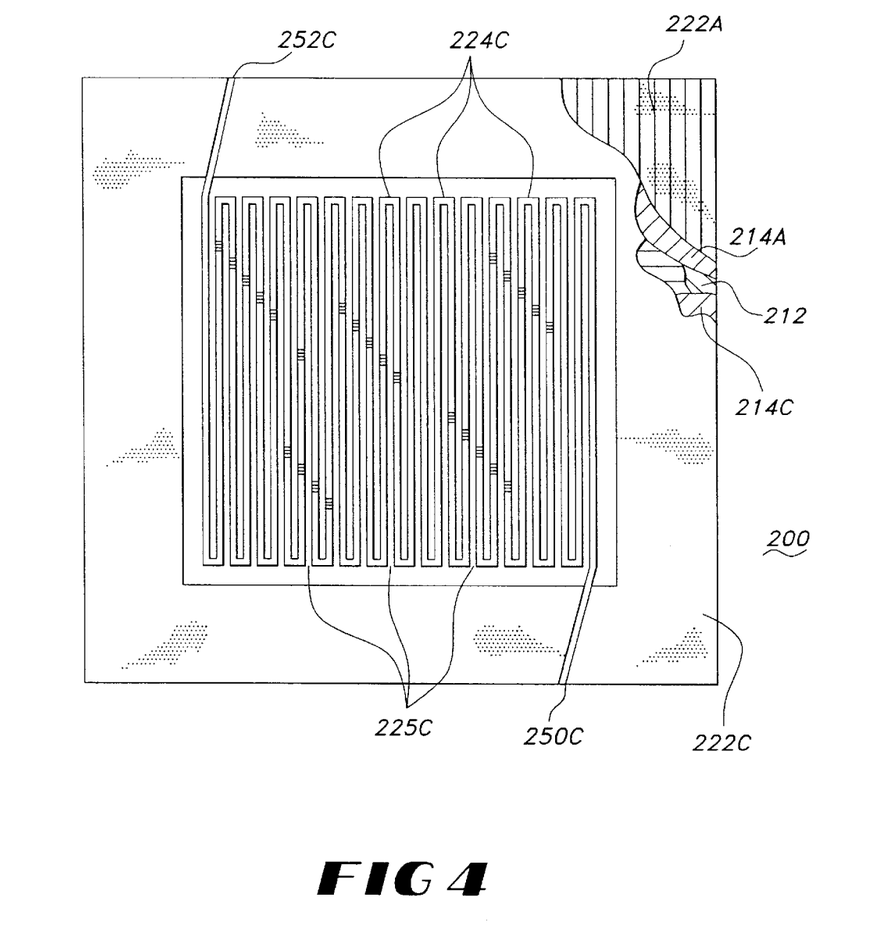
FIG. 4 is a cross-sectional view with a partial cutaway of the fuel cell of FIG. 2 showing a continuous fluid channel for a fluid-flow field plate on a graphite plate.

FIG. 4 is a cross-sectional view of a partial cutaway of the fuel cell 200 taken along the 4—4 axis showing fluid-flow field plate 222C. The fluid-flow field plate 222C includes a single continuous fluid-flow channel 224C which has a fluid inlet 252C and a fluid outlet 250C. Fluid inlet 252C is connected to a source of oxidant (not shown). Continuous flow channel 224C traverses in a plurality of passes a major central area of fluid-flow field plate 222C, which corresponds to the electrocatalytically active region of the cathode 220. Fluid field flow plate 222A has a similarly connected fluid-flow channel 224A, but its fluid inlet is connected to a fuel source.

Figure 5:
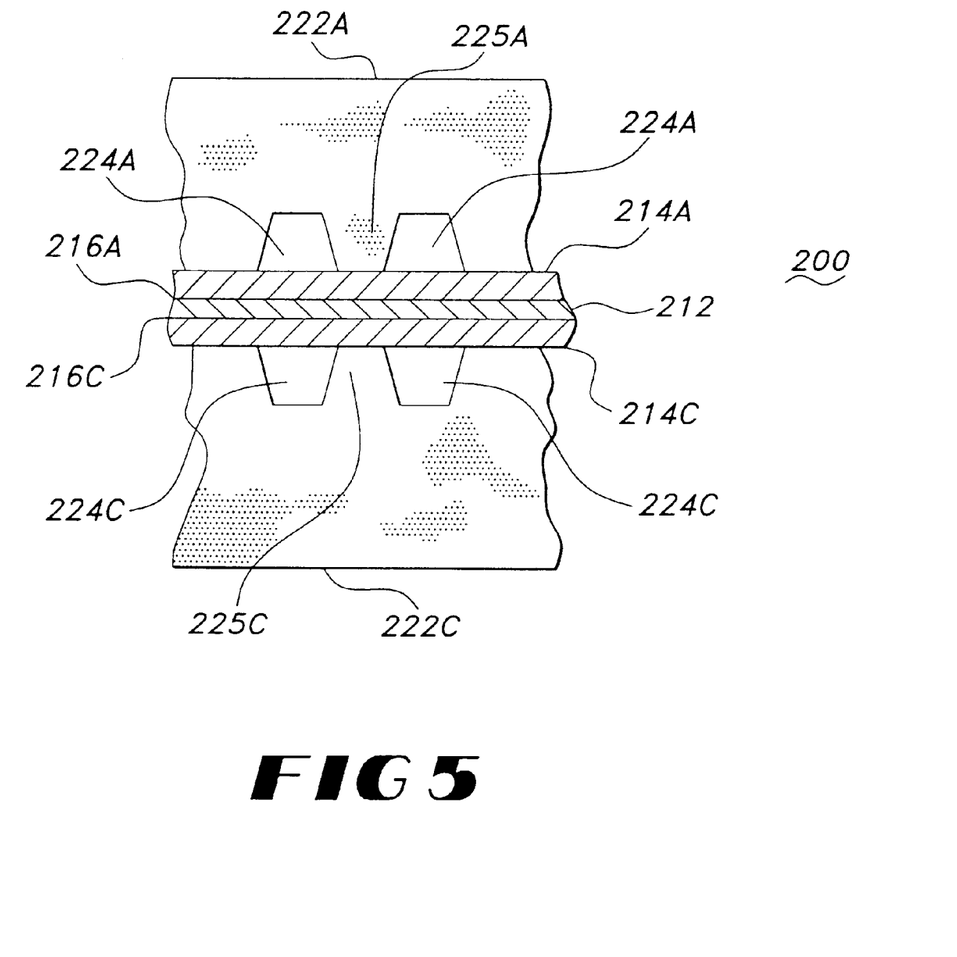
FIG. 5 is a partial cross-sectional view of the continuous fluid channels of the fuel cell of FIG. 2.

FIG. 5 is a partial cross-sectional view of the fuel cell 200, further detailing the fluid-flow channels 224A, 224C. Fluid-flow channels 224A, 224C are separated by walls 225A, 225C, respectively. The fluid-flow channels 224A, 224C are typically 1.5 mm deep and 1–1.5 mm wide and extend to cover the electrode area of the fuel cell 200. The walls 225A, 225C are typically 1–1.5 mm inch thick. The fluid-flow channels 224A, 224C are formed by a mechanical deformation process, such as stamping, pressing, milling, molding and the like. A compression plate bearing a relief pattern of the fluid-flow channel is useful to impress the pattern in the flexible graphite sheet. The density of the fluid field plates 222A, 222C before mechanical deformation is approximately 0.1 to 0.5 gm/cc (5 to 32 lbs/ft$^3$) and after stamping the density typically exceeds 1.1 g/cc (69 lbs/ft$^3$). Fluid field plates 222A, 222C are the flexible graphite sheet 100 of the present invention sealed with a sealant, as described above.

Curable sealants useful with the present invention include any suitable sealant type such as phenolic resins, vinyl resins, silicone resins, acrylic resins, epoxy resins and the like. However, the present invention is particularly useful with (meth)acrylic resins. (Meth)acrylic resins are useful in porosity impregnation applications due to their highly advantageous viscosity characteristics and rapid curability in anaerobic cure and/or heat-curing formulations. Illustrative commercially available impregnation sealing compositions which may be utilized in the practice of the present invention include Resinol® 90C sealant (a registered trademark of Loctite Corporation, Rocky Hill, Conn.), a heat-curable (meth)acrylic resin; and Resinol® RTC sealant (a registered trademark of Loctite Corporation, Rocky Hill, Conn.), an anaerobic sealant composition curable at ambient temperatures in the substantial absence of oxygen. These resins may be accompanied by other conventionally-used composition components, such as polymerization initiators, catalysts, plasticizers and the like.

Desirably, the sealant has a polymerizable component with a majority of polyfunctional (meth)acrylate esters (hereinafter, poly(meth)acrylate esters). These polyfunctional esters produce cross-linked polymers, which serve as effective and durable sealants, adhesives and coatings. While various (meth)acrylate esters may be used, desirable poly(meth)acrylate esters include those with the following general formula:

(VI)

wherein $R^1$ represents a radical selected from the group consisting of hydrogen, lower alkyl of from 1 to about 4 carbon atoms, hydroxyalkyl of from 1 to about 4 carbon atoms and (VII)

$R^2$ is a radical selected from the group consisting of hydrogen, halogen, and lower alkyl of from 1 to about 4 carbon atoms; $R^3$ is a radical selected from the group consisting of hydrogen, hydroxyl, and (VIII)

and m may be 0 to 12, and desirably from 0 to about 6; n is equal to at least 1, e.g., 1 to about 20 or more, and desirably between about 2 to about 6; k is 1 to about 4; and p is 0 or 1.

The polymerizable poly(meth)acrylate esters corresponding to the above general formula are exemplified by, but not restricted to, the following materials: di-, tri- and tetraethyleneglycol dimethacrylate, dipropyleneglycol dimethacrylate; polyethyleneglycol dimethylacrylate (PEGMA); di(pentamethyleneglycol) dimethacrylate; tetraethyleneglycol diacrylate; tetraethyleneglycol di(chloracrylate); diglycerol diacrylate; diglycerol tetramethacrylate; tetramethylene dimethacrylate; ethylene dimethacrylate; and neopentylglycol diacrylate. Combinations and derivatives of these polyfunctional materials are contemplated.

Monofunctional (meth)acrylate esters (esters containing one (meth)acrylate group) are also useful. The most common of these monofunctional esters include the alkyl esters such as lauryl methacrylate. Many of the lower molecular weight alkyl esters are quite volatile, and frequently it is more desirable to use a higher molecular weight homolog, such as decyl methacrylate or dodecyl methacrylate, or any other fatty acid acrylate esters, in (meth)acrylate-based impregnating compositions.

When monofunctional (meth)acrylate esters are employed in the present invention, it is desirable to use an ester which has a relatively polar alcohol moiety. Such materials are less volatile than low molecular weight alkyl esters and, in addition, the polar group tends to provide intermolecular attraction in the cured polymer, thus producing a more durable seal. Desirably the polar group is selected from the group consisting of labile hydrogen, heterocyclic ring, hydroxy, amino, cyano, and halogen polar groups. Typical examples of compounds within this category are cyclohexylmethacrylate, tetrahydrofurfuryl methacrylate, hydroxyethyl acrylate (HEMA), hydroxypropyl methacrylate (HPMA), t-butylaminoethyl methacrylate, and chloroethylmethacrylate. Combinations of monofunctional (meth)acrylate are contemplated.

The sealants of the present invention may be anaerobically curable through a free-radical mechanism, with an initiator being present therein, or an initiator system comprising a redox polymerization initiator (i.e., an ingredient or a combination of ingredients which produce an oxidation-reduction reaction, resulting in the production of free radicals). Suitable initiators include peroxy materials, e.g., peroxides, hydroperoxides, and peresters, which are capable of inducing polymerization of the sealant compositions in the substantial absence of oxygen, and yet not induce polymerization as long as oxygen is present. Organic hydroperoxides are the desirable peroxy materials with t-butyl hydroperoxide and cumene hydroperoxide being particularly useful with the anaerobic-curing compositions.

In addition to initiator components, sealants useful with the present invention may include various initiator accelerators, as for example hydroperoxide decomposition accelerators, when hydroperoxides are used as cure initiators in the sealant material. Typical examples of potentially suitable accelerators include: tertiary amines such as tributyl amine; sulfimides such as benzoic sulfimide (or saccharin); formamide; and compounds containing transition metals, such as copper octanoate.

The useful sealants may also be heat-curable compositions through a free-radical mechanism, with a heat-cure initiator being present therein, or an initiator system comprising a redox polymerization initiator (i.e., an ingredient or a combination of ingredients which at the desired elevated temperature conditions, e.g., from about 90 to about 150° C. (194 to 302° F.), produce an oxidation-reduction reaction, resulting in the production of free radicals). Suitable initiators may include peroxy materials, e.g., peroxides, hydroperoxides, and peresters, which under appropriate elevated temperature conditions decompose to form peroxy free radicals which are initiatingly effective for the polymerization of the heat-curable compositions.

Another useful class of heat-curing initiators comprises azonitrile compounds which yield free radicals when decomposed by heat. Heat is applied to cure the composition, and the resulting free radicals initiate polymerization of the heat-curable composition.

For example, azonitrile may be a compound of the formula:

(IX)

wherein $R^4$ is a methyl, ethyl, n-propyl, iso-propyl, iso-butyl or n-pentyl radical, and $R^5$ is a methyl, ethyl, n-propyl, iso-propyl, cyclopropyl, carboxy-n-propyl, iso-butyl, cyclobutyl, n-pentyl, neo-pentyl, cyclopentyl, cyclohexyl, phenyl, benzyl, p-chlorbenzyl, or p-nitrobenzyl radical or $R^4$ and $R^5$, taken together with the carbon atom to which they are attached, represent a radical of the formula (X)

wherein m is an integer from 3 to 9, or the radical (XI)

Compounds of the above formula are more fully described in U.S. Pat. No. 4,416,921, the disclosure of which hereby is incorporated herein by reference.

Azonitrile initiators of the above-described formula are readily commercially available, e.g., the initiators which are commercially available under the trademark VAZO® from E. I. DuPont de Nemours and Company, Inc. (Wilmington, Del.), including VAZO® 52 ($R^4$=methyl, $R^5$=isobutyl), VAZO® 64 ($R^4$=methyl, $R^5$=methyl), and VAZO® 67 ($R^4$=methyl, $R^5$=ethyl), all such $R^4$ and $R^5$ constituents being identified with reference to the above-described azonitrile general formula.

A desirable azonitrile initiator is 2,2'-azobis(isobutyronitrile) or AZBN.

The azonitrile may be employed in the inventive heat-curable compositions in concentrations on the order of about 500 to about 10,000 parts per million (ppm) by weight, desirably about 1000 to about 5000 ppm.

Other (meth)acrylic monomer-based impregnant compositions of a heat-curable character may be employed in the broad practice of the present invention, including those disclosed in UK Patent Specifications 1,308,947 and 1,547,801. As described in these references, the monomeric impregnant composition may contain suitable inhibitors serving to restrict or preclude the occurrence of polymerization of the monomer, at temperatures below those desired or recommended for heat-curing of the impregnant composition.

The invention may be further understood with reference to the following non-limiting examples. Percent weights are per the total composition unless otherwise specified.

EXAMPLES

Example 1

A flexible graphite panel having a density of about 0.22 g/cm$^3$, dimensions of about 6.0 cm×6.0 cm×0.48 cm and a mass of about 3.771 g was placed and secured in an empty 1 liter vacuum impregnation chamber. The chamber was fitted with a pressure-compensating reservoir containing liquid porosity sealant Resinol® 90C, supplied by the Loctite Corporation. The chamber and reservoir were evacuated to a pressure of about 0.13 kilopascals (1 torr) at 23° C. (73° F.). After 15 minutes, a sufficient volume (about 300 ml) of the liquid sealant was fed into the chamber to completely submerse the graphite panel. The pressure was maintained at about 0.13 kilopascals (1 torr) for an additional 15 minutes after which the vacuum was released and the pressure restored to ambient. The panel was held in the submersed state for an additional 1 hour, then removed from the chamber and rinsed with water to remove all traces of the sealant adhering to the external surface. The washed panel was carefully dried with tissue paper and weighed. The final weight was 19.965 g corresponding to a weight increase of 429% and a void fill of 95% by volume.

Example 2

A flexible panel having a density of about 1.14 g/cm$^3$, dimensions of about 6.0 cm×6.0 cm×0.076 cm and a mass of about 3.113 g was impregnated under the conditions described in Example 1. The final weight was 3.808 g corresponding to a weight increase of 22% and a void fill of 48%. The lower density panel of Example 1 exhibited substantially greater sealant infusion as compared to the higher density panel of Example 2.

Example 3

The impregnated panel of Example 1 was placed between two glass panels and gently compressed under hand pressure. During the compression, the impregnated liquid was observed to ooze from the panel. The thickness of the panel decreased with increasing loss of sealant.

Example 4

The compressed, impregnated panel of Example 3 is rinsed with water to remove excess sealant from the panel's exterior surface. The panel is cured under elevated temperature conditions from about 90 to about 180° C. to provide a substantially gas impermeable graphite plate. The sealant is cured within a few minutes or up to an hour. The curing time depends upon the final plate thickness, the amount of sealant take-up, the curing temperature and the amount of heat-curing initiators and accelerators.

Example 5

A flexible graphite panel, as described in Example 1, is impregnated with a liquid porosity sealant Resinol® RTC, supplied by the Loctite Corporation, under conditions as described in Example 1. The seal up-take is an increase of 429% by weight, which represents a void fill of 95% by volume.

The impregnated panel is then compressed under conditions of Example 3. The compressed panel is rinsed to remove excess sealant. The rinsed panel is held between two plates to exclude oxygen. Within about 20 minutes the sealant is cured to provide a substantially gas impermeable graphite plate. The curing time depends on the final plate thickness, the amount of sealant take-up, the degree of oxygen exclusion, and the amount of anaerobic-curing initiators and accelerators.

The invention being thus described, it will be clear to those persons of skill in the art that many variations exist, which are not to be regarded as a departure from the spirit and scope of the invention. All such variations are intended to be within the scope of the claims.

What is claimed is:

1. A method for forming a graphite plate sealed with a sealant, said method comprising:
   a. providing a graphite sheet having opposed planar surfaces defining an interior portion therebetween, said sheet being formed from exfoliated graphite particles to provide said interior with pores and defining a graphite density of said sheet;
   b. providing a curable sealant;

c. contacting said sealant with at least one of said planar surfaces, allowing said sealant to communicate through said pores;

d. compressing said sheet to form a graphite plate having graphite density after compression, wherein said graphite density is greater after compression than before compression; and e. curing said sealant contained within said pores to seal said plate.

2. The method of claim 1 wherein said graphite density before compression is from about 0.08 to about 0.8 g/cc.

3. The method of claim 1 wherein said graphite density before compression is from about 0.08 to 0.5 g/cc.

4. The method of claim 1 wherein said graphite density after compression is from about 1.0 to 2.2 g/cc.

5. The method of claim 1 wherein compressing further includes forming a pattern in at least one of said planar surfaces.

6. The method of claim 5 wherein said plate is a fluid-flow plate of a fuel cell and further wherein said pattern is a continuous fluid-flow channel.

7. The method of claim 1 further comprising the step of filling from about 70% to about 95% of said pores on a volume basis with said sealant.

8. The method of claim 1 wherein selecting said sealant includes selecting a sealant from the group consisting of a phenolic resin, a vinyl resin, a silicone resin, an acrylic resin, an epoxy resin, and combinations thereof.

9. The method of claim 1 further including the step of providing a free radical initiator in initiate cure of said sealant.

10. The method of claim 9 wherein said free radical initiator includes a heat-curing initiator to produce free radicals by thermal decomposition to cure said sealant.

11. The method of claim 10 wherein said heat-curing initiator is selected from the group consisting of a peroxide, a hydroperoxide, a perester, an azonitrile and combinations thereof.

12. The method of claim 9 wherein said free radical initiator includes an anaerobic-curing initiator to produce free radicals upon the exclusion of oxygen to cure said sealant.

13. The method of claim 12 wherein said anaerobic-curing initiator is a peroxy initiator selected from the group consisting of hydroperoxides, peroxides, peresters and combinations thereof.

14. The method of claim 12 wherein said anaerobic-curing initiator includes an anaerobic accelerator selected from the group consisting of tributyl amine, benzoic sulfimide, formamide, copper octanoate and combinations thereof.

15. The method of claim 1 wherein said selecting said sealant further comprises selecting a curable poly(meth) acrylate ester having the formula:

wherein $R^1$ represents a radical selected from the group consisting of hydrogen, lower alkyl of from 1 to about 4 carbon atoms, hydroxyalkyl of from 1 to about 4 carbon atoms and $R^2$ is a radical selected from the group consisting of hydrogen, halogen, and lower alkyl of from 1 to about 4 carbon atoms; $R^3$ is a radical selected from the group consisting of hydrogen, hydroxyl and m is 0 to about 12, n is equal to at least 1, k is 1 to about 4 and p is 0 or 1.

16. The method of claim 15 wherein said selecting said sealant further comprises selecting a monofunctional acrylate ester, said monofunctional acrylate ester being selected from the group consisting of lauryl methacrylate, cyclohexylmetharylate, tetrahydrofurfuryl methacrylate, hydroxyethyl acrylate, hydroxypropyl methacrylate, t-butylaminoethyl methacrylate, cyanoethylacrylate, chloroethylmethacrylate and combinations thereof.

17. A graphite plate comprising:

a. a graphite sheet formed from exfoliated graphite particles and having an internal, portion with pores between opposed planar surfaces; and b. a curable sealant contained within greater than 70% of said pores on a volume basis, wherein upon curing said sealant said graphite sheet is sealed with said sealant to form said plate.

18. The graphite plate of claim 17 wherein said sealant includes a sealant selected from the group consisting of a phenolic resin, a vinyl resin, a silicone resin, an acrylic resin, an epoxy resin, and combinations thereof.

19. The graphite plate of claim 17 further including a free radical initiator to initiate cure of said sealant.

20. The graphite plate of claim 19 wherein said free radical initiator includes a heat-curing initiator to produce free radicals by thermal decomposition to cure said sealant.

21. The graphite plate of claim 20 wherein said heat-curing initiator is selected from the group consisting of a peroxide, a hydroperoxide, a perester, an azonitrile and combinations thereof.

22. The graphite plate of claim 19 wherein said free radical initiator includes an anaerobic-curing initiator to produce free radicals upon the exclusion of oxygen to cure said sealant.

23. The graphite plate of claim 22 wherein said anaerobic-curing initiator is a peroxy initiator selected from the group consisting of hydroperoxides, peroxides, peresters and combinations thereof.

24. The graphite plate of claim 22 wherein said anaerobic-curing initiator includes an anaerobic accelerator selected from the group consisting of tributyl amine, benzoic sulfimide, formamide, copper octanoate and combinations thereof.

25. The graphite plate of claim 17 wherein said sealant further comprises a curable poly(meth)acrylate ester having the formula:

wherein $R^1$ represents a radical selected from the group consisting of hydrogen, lower alkyl of from 1 to about 4 carbon atoms, hydroxyalkyl of from 1 to about 4 carbon atoms and $R^2$ is a radical selected from the group consisting of hydrogen, halogen, and lower alkyl of from 1 to about 4 carbon atoms; $R^3$ is a radical selected from the group consisting of hydrogen, hydroxyl and m is 0 to about 12, n is equal to at least 1, k is 1 to about 4 and p is 0 or 1.

26. The graphite plate of claim 25 sealant further comprising a monofunctional acrylate ester, said monofunctional acrylate ester being selected from the group consisting of lauryl methacrylate, cyclohexylmetharylate, tetrahydrofurfuryl methacrylate, hydroxyethyl acrylate, hydroxypropyl methacrylate, t-butylaminoethyl methacrylate, cyanoethylacrylate, chloroethylmethacrylate and combinations thereof.

27. The graphite plate of claim 14 wherein said graphite plate is compressed to form a fluid-flow plate of a fuel cell.

28. The graphite plate of claim 24 wherein said fluid-flow plate includes a continuous fluid-flow channel extending through at least one of said planar surfaces.

\* \* \* \* \*

Adverse Decision in Interference

Patent No. 6,656,580 B2, John G. Woods, IMPREGNATION OF A GRAPHITE SHEET WITH A SEALANT, Interference No. 105,627, final judgment adverse to the patentees rendered June 9, 2008, as to claims 1-28.

(*Official Gazette September 9, 2008*)